Patented Dec. 27, 1938

2,142,033

UNITED STATES PATENT OFFICE 2,142,033

PROCESS FOR THE PRODUCTION OF 2-P-DIOXANONE

Raymond W. McNamee, South Charleston, and Charles M. Blair, Charleston, W. Va., assignors to Carbide and Carbon Chemicals Corporation, a corporation of New York No Drawing. Application July 1, 1936, Serial No. 88,337

4 Claims. (Cl. 260—338)

This invention is a new process for preparing 2-p-dioxanone,

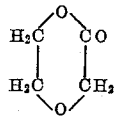

from diethylene glycol. Broadly, the process comprises the dehydrogenation of diethylene glycol by the aid of a catalyst, and under appropriate conditions of temperature and pressure wherein 2-p-dioxanone is produced and subsequently isolated.

More specifically, the new process comprises passing the vapors of diethylene glycol over a catalyst composed essentially of reduced copper and chromium, supported on an inert carrier such as porous silica filter stone, and maintained at a temperature of from about 240° to about 360° C. The issuing products consisting of unchanged diethylene glycol together with 2-p-dioxanone may be condensed (with the exception of hydrogen, which passes off as a gas), and refined by any convenient method to recover the pure product. The pure compound obtained by this process is a solid at room temperature, with a melting point of 26.7° C., a boiling point of 110° C. at a pressure of 25 mm. of mercury, and a specific gravity of 1.266 at 25°/4° C.

A satisfactory catalyst for use in the process may be one comprising reduced copper and chromium (the latter probably present as an oxide), supported on an inert carrier, such as artificial porous silica filter stone. The preferred catalyst may be prepared by impregnating an inert carrier with salts of copper and chromium, for example their nitrates, in the desired ratio, followed by roasting and reduction of the impregnated material. The chromium content may vary considerably, but should not exceed about 5%. Other dehydrogenating catalysts performing a similar function may be used; for example, copper alone, or supported on an inert carrier, may be employed, as well as cobalt, iron, platinum, nickel and palladium. It should be understood the catalyst described is not an essential part of this invention.

The following example will serve to illustrate more completely the process:

A continuous flow of diethylene glycol vapor at the rate of 130 grams per hour was passed into a chamber which contained 150 cc. of a catalyst comprising reduced copper and chromium and a porous silica carrier. This catalyst contained these metals in the proportions of about 96.5% of copper and 3.5% of chromium. A temperature of from about 270° to about 280° C. was maintained throughout the reaction. The effluent vapors were condensed, with the exception of hydrogen, which was analyzed and found to be 97% pure. The condensate was then distilled, and 2-p-dioxanone recovered. The product was obtained at an efficiency of 75%, with an overall yield of 25%.

This invention is by no means limited to the example cited, and it is clearly apparent the process may be varied considerably. For example, widely differing temperatures may be used, depending largely upon the pressure and the particular catalyst selected. In general, temperatures of from about 240° to about 360° C. at atmospheric pressure are suitable. The rate of flow may be varied and, in general, the production of the compound is directly dependent upon the rate of flow. Other modifications which will not materially alter the process will be apparent, and such modifications are included within the scope of the invention as defined by the appended claims.

We claim:

1. Process for preparing 2-p-dioxanone which comprises dehydrogenating diethylene glycol by the aid of a metallic dehydrogenating catalyst at a temperature of from about 240° to about 360° C.

2. Process for preparing 2-p-dioxanone which comprises dehydrogenating diethylene glycol vapor by the aid of a metallic catalyst essentially containing copper at a temperature of from about 240° to about 360° C.

3. Process for preparing 2-p-dioxanone which comprises dehydrogenating diethylene glycol vapor by the aid of a reduced copper and chromium catalyst at a temperature of from about 240° to about 360° C.

4. Process for preparing 2-p-dioxanone which comprises dehydrogenating diethylene glycol vapor by the aid of a reduced copper and chromium catalyst at a temperature of from about 270° to about 280° C.

RAYMOND W. McNAMEE.
CHARLES M. BLAIR.